(12) United States Patent
Chao

(10) Patent No.: US 7,271,850 B2
(45) Date of Patent: Sep. 18, 2007

(54) METHOD AND APPARATUS FOR CROSS COLOR/CROSS LUMINANCE SUPPRESSION

(75) Inventor: Po-Wei Chao, Taipei Hsien (TW)

(73) Assignee: Realtek Semiconductor Corp., HsinChu (TW)

( * ) Notice: Subject to any disclaimer, the term of this patent is extended or adjusted under 35 U.S.C. 154(b) by 430 days.

(21) Appl. No.: 10/710,340

(22) Filed: Jul. 2, 2004

(65) Prior Publication Data

US 2006/0017854 A1    Jan. 26, 2006

Related U.S. Application Data

(63) Continuation-in-part of application No. 10/710,072, filed on Jun. 16, 2004.

(51) Int. Cl.
*H04N 9/64* (2006.01)
*H04N 9/77* (2006.01)

(52) U.S. Cl. .................. 348/609; 348/624; 348/666; 348/701

(58) Field of Classification Search ........... 348/624, 348/666, 609, 699, 713, 700, 701, 451, 452; 382/167
See application file for complete search history.

(56) References Cited

U.S. PATENT DOCUMENTS

| 4,530,004 | A | * | 7/1985 | Achiha et al. ............ 348/450 |
| 4,670,773 | A | * | 6/1987 | Silverberg ............ 348/427.1 |
| 4,706,112 | A | | 11/1987 | Faroudja et al. |
| 4,723,157 | A | * | 2/1988 | Wendland et al. ....... 348/427.1 |
| 4,731,660 | A | | 3/1988 | Faroudja et al. |
| 4,831,463 | A | | 5/1989 | Faroudja |
| 4,837,611 | A | | 6/1989 | Faroudja |
| 4,893,176 | A | | 1/1990 | Faroudja |
| 4,916,526 | A | | 4/1990 | Faroudja et al. |
| 4,918,515 | A | | 4/1990 | Faroudja |
| 4,943,849 | A | | 7/1990 | Faroudja et al. |
| 4,967,271 | A | * | 10/1990 | Campbell et al. ........... 348/701 |
| 4,984,068 | A | * | 1/1991 | Sugiyama et al. .......... 348/669 |
| 5,012,329 | A | * | 4/1991 | Lang et al. ................. 348/667 |
| 5,019,895 | A | * | 5/1991 | Yamamoto et al. ......... 348/609 |
| 5,023,713 | A | * | 6/1991 | Nishigori .................... 348/702 |
| 5,027,194 | A | * | 6/1991 | Scheffler .................... 348/609 |
| 5,055,920 | A | * | 10/1991 | Illetschko et al. .......... 348/624 |
| 5,063,438 | A | | 11/1991 | Faroudja |
| 5,146,318 | A | * | 9/1992 | Ishizuka et al. ............ 348/669 |
| 5,249,037 | A | * | 9/1993 | Sugiyama et al. .......... 348/452 |
| 5,305,095 | A | * | 4/1994 | Song ......................... 348/665 |
| 5,305,120 | A | | 4/1994 | Faroudja |
| 5,428,398 | A | | 6/1995 | Faroudja |

(Continued)

*Primary Examiner*—David Ometz
*Assistant Examiner*—Jean W. Désir
(74) *Attorney, Agent, or Firm*—Winston Hsu

(57) ABSTRACT

According to embodiments of the present invention, a method for processing an image in a video data is disclosed. The video data comprises at least a first frame and a second frame. The first frame is composed of a first even field and a first odd field, while the second frame is composed of a second even field and a second odd field. The method comprises obtaining a first difference set between pixel information of the first frame and pixel information of the second frame, wherein the first frame and the second frame are adjacent to each other; examining a first criterion with the first difference set; and performing cross color suppressing operation on pixel information of the second frame according to a set of stationary image judgment information comprising the result of the first criterion examination.

20 Claims, 5 Drawing Sheets

U.S. PATENT DOCUMENTS

| | | | |
|---|---|---|---|
| 5,448,305 A * | 9/1995 | Hagino | 348/665 |
| 5,457,501 A * | 10/1995 | Hong | 348/668 |
| 5,483,294 A * | 1/1996 | Kays | 348/609 |
| 5,502,509 A * | 3/1996 | Kurashita et al. | 348/669 |
| 6,956,620 B2 * | 10/2005 | Na | 348/663 |
| 6,987,884 B2 * | 1/2006 | Kondo et al. | 382/190 |
| 6,995,804 B2 * | 2/2006 | Kwon et al. | 348/663 |
| 7,061,548 B2 * | 6/2006 | Piepers | 348/624 |
| 7,098,957 B2 * | 8/2006 | Kim et al. | 348/452 |
| 2005/0134745 A1 * | 6/2005 | Bacche et al. | 348/702 |
| 2005/0168650 A1 * | 8/2005 | Walls et al. | 348/666 |

* cited by examiner

| Ae | Be | Ce |
|----|----|----|
| Ao | Bo | Co |
| De | Ee | Fe |
| Do | Eo | Fo |
| Ge | He | Ie |
| Go | Ho | Io |

Frame 0

| A'e | B'e | C'e |
|-----|-----|-----|
| A'o | B'o | C'o |
| D'e | E'e | F'e |
| D'o | E'o | F'o |
| G'e | H'e | I'e |
| G'o | H'o | I'o |

Frame 1

Fig. 3

METHOD AND APPARATUS FOR CROSS COLOR/CROSS LUMINANCE SUPPRESSION

CROSS REFERENCE To RELATED APPLICATIONS

This is a continuation-in-part of U.S. application Ser. No. 10/710,072, filed Jun. 16, 2004, which is incorporated herein by reference.

BACKGROUND OF INVENTION

1. Field of the Invention

The present invention relates to improving display quality of an image. More specifically, the present invention discloses a method and apparatus of performing cross color and/or cross luminance suppression to improve display quality.

2. Description of the Prior Art

In composite video television systems such as NTSC and PAL, a luminance signal and a chrominance signal share a portion of the available bandwidth. In NTSC, for example, chrominance information is encoded through a subcarrier having frequency equaling 3.57955 MHz. Within the chrominance band extending from roughly 2.3MHz to 4.2 MHz, the luminance spectrum overlaps that chrominance spectrum. In other words, the signal interference occurs.

It is well-known that a television decoder is implemented to extract both luminance information and chrominance information from the received composite signal; however, a typical simple television decoder cannot discern which of the higher frequency components are luminance information and which are chrominance information. As a result, such a television decoder generates incorrect chrominance information owing to the interference introduced via the luminance spectrum. The term "cross color" is commonly referred to corruption of the chrominance spectrum caused by the misinterpretation of high-frequency luminance information as wanted chrominance information. Conversely, the term "cross luminance" is commonly referred to corruption of the luminance spectrum caused by the misinterpretation of chrominance information as high-frequency luminance information.

Typical conventional methods reduce cross color by operating upon chrominance information encoded on the chrominance subcarrier prior to demodulation into baseband chrominance information. These methods typically incorporate cross color suppression into the decoding process, focusing on improving the separation of the chrominance and luminance information to reduce both cross color and cross luminance.

However, cross color suppression is very desirable in applications where only demodulated baseband chrominance information is available, especially where demodulation was performed without much regard for suppressing cross color. In such applications, for practical reasons, cross color suppression must be performed in the baseband domain.

As such, Faroudja provides a technique for suppressing cross color in U.S. Pat. No. 5,305,120, the contents of which are hereby incorporated by reference. Although Faroudja suggests a feasible approach for post-decoding cross color suppression, a more optimized motion detection algorithm can further be proposed in order to minimize possible error occurrence in the outcome of cross color suppression caused by over-simplified stationary image judgment. Moreover, in order to reduce manufacturing costs, a motion detection algorithm that can minimize the memory size requirement is also desirable.

SUMMARY OF INVENTION

It is therefore one of the objectives of the claimed invention to provide a method of suppressing cross-color and/or cross luminance of an image by introducing a well-designed motion detection algorithm.

According to embodiments of the present invention, a method for processing an image in a video data is disclosed. The video data comprises at least a first frame and a second frame. The first frame is composed of a first even field and a first odd field, while the second frame is composed of a second even field and a second odd field. The method comprises obtaining a first difference set between pixel information of the first frame and pixel information of the second frame, wherein the first frame and the second frame are adjacent to each other; examining a first criterion with the first difference set; and performing cross color suppressing operation on pixel information of the second frame according to a set of stationary image judgment information comprising the result of the first criterion examination.

According to embodiments of the present invention, the method for processing an image in a video data further comprises obtaining a second difference set between pixel information of an even field and an odd field of the same frame; and examining a second criterion with the second difference set; wherein the set of stationary image judgment information further comprising the result of the second criterion examination.

According to embodiments of the present invention, the method for processing an image in a video data further comprises obtaining a third difference set comprising a difference between pixel information of a target pixel in one of the two frames and pixel information of the pixel at the top of the target pixel, and a difference between pixel information of the target pixel and pixel information of the pixel at the bottom of the target pixel; and examining a third criterion with the third difference set; wherein the set of stationary image judgment information further comprising the result of the third criterion examination.

These and other objectives of the claimed invention will no doubt become obvious to those of ordinary skill in the art after reading the following detailed description of the embodiments that are illustrated in the various figures and drawings.

BRIEF DESCRIPTION OF DRAWINGS

FIG. 3 is a diagram illustrating the pixel allocation of a portion of the image frames in FIG. 2.

DETAILED DESCRIPTION

Figure 1:
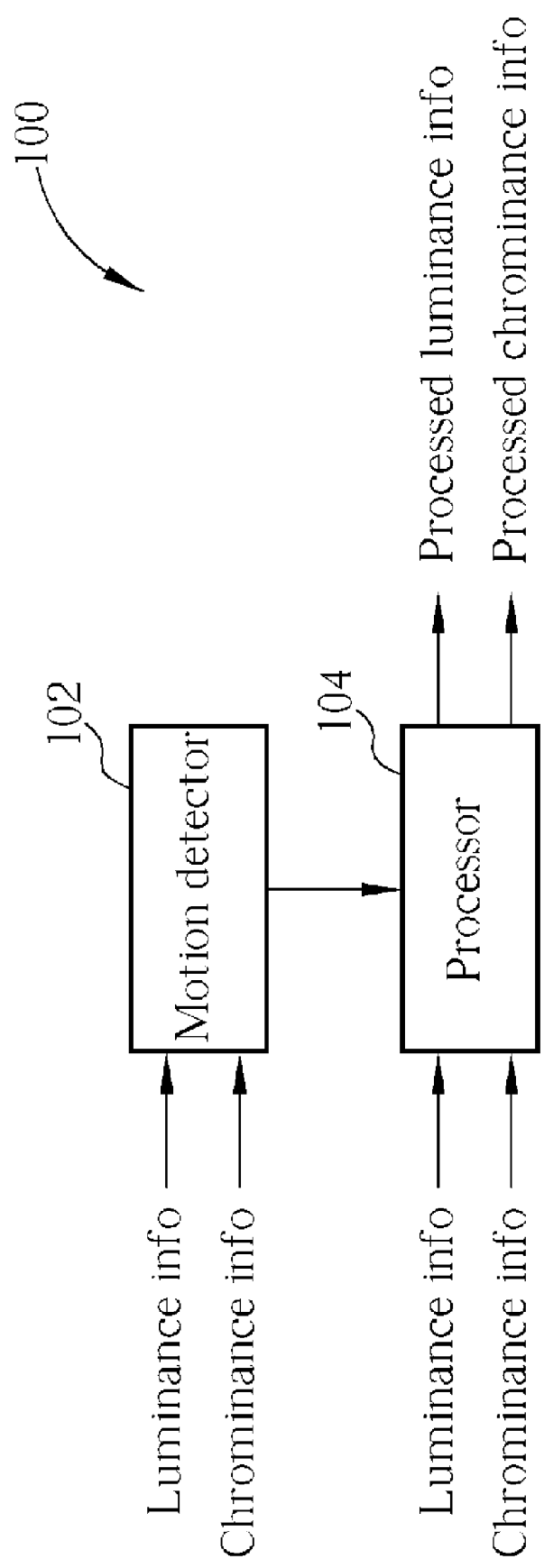
FIG. 1 is a block diagram of a cross color and cross luminance suppression apparatus according to an embodiment of the present invention.

Please refer to FIG. 1, which is a block diagram illustrating a cross color and cross luminance suppression apparatus 100 according to an embodiment of the present invention. In this embodiment, the apparatus 100 comprises a motion detector 102 and a processor 104. The motion detector 102 successively receives a plurality of pixel information, which may include, in one embodiment, luminance information (Y) and chrominance information (U and V, or $C_r$ and $C_b$), representative of a series of pixel data in image frames. The motion detector 102 then generates a motion control signal according to the received pixel information. The motion control signal indicates whether a current pixel is deemed stationary (i.e., still), or deemed to be with motion. The processor 104 also receives the pixel information, here, the luminance information and the chrominance information, and performs cross color suppressing operation on the chrominance information, as well as cross luminance suppressing operation on the luminance information. By doing so, the pixel information outputted by the processor 104 is free of cross color and cross luminance influence.

Figure 2:
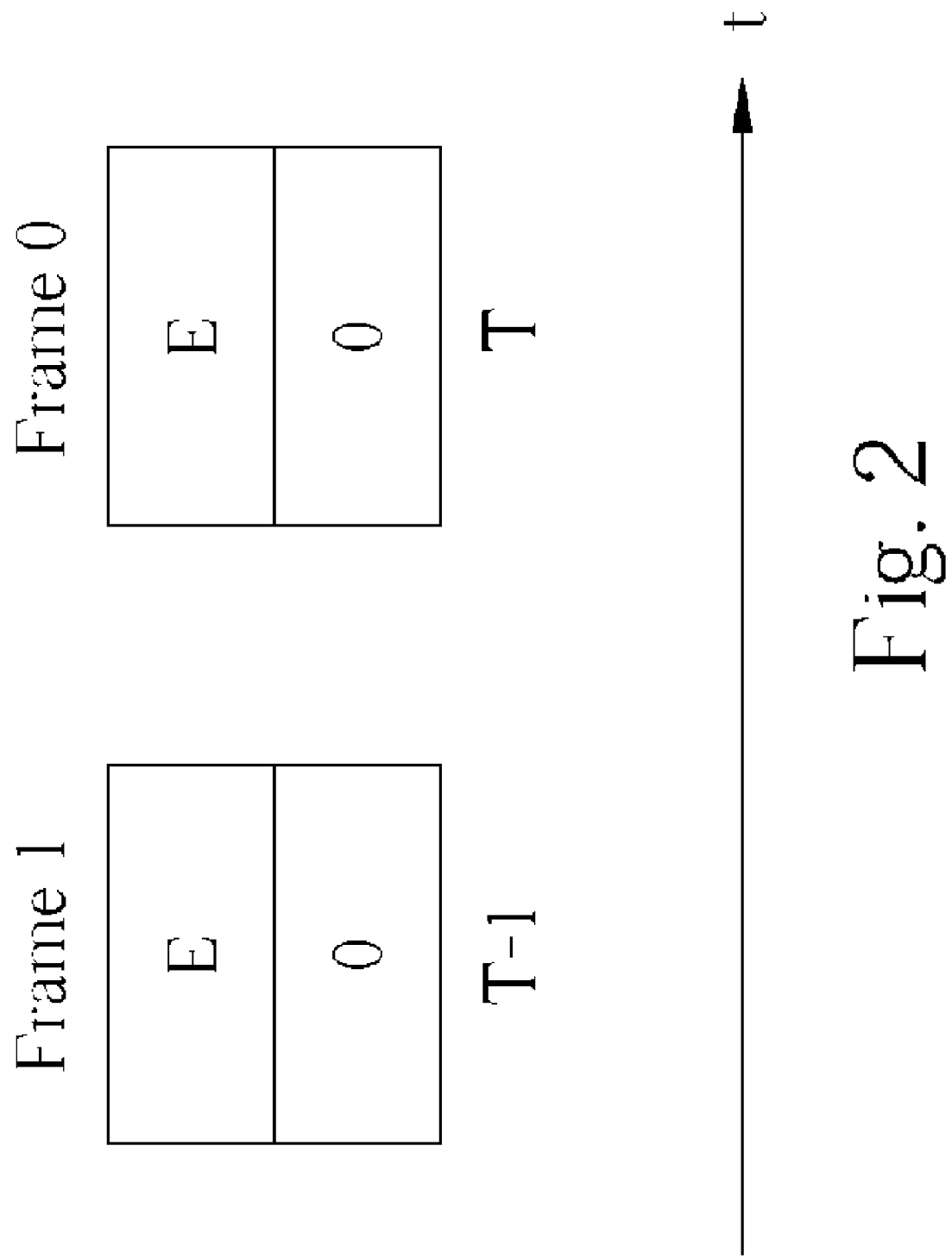
FIG. 2 is a timing diagram conceptually illustrating a plurality of sequentially incoming image frames of the apparatus in FIG. 1.
Figure 4:
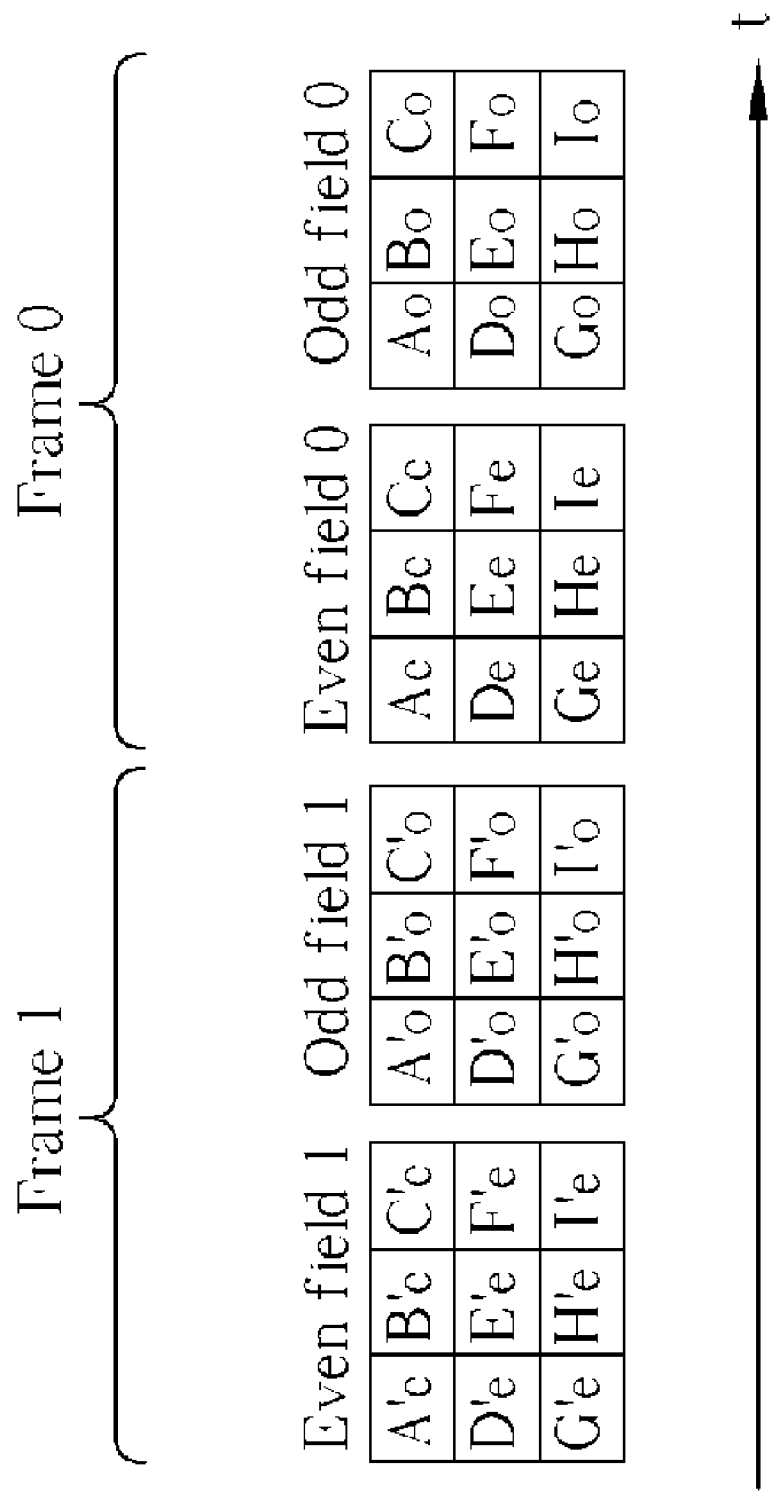
FIG. 4 is a timing diagram conceptually illustrating a plurality of sequentially incoming image fields of the apparatus in FIG. 1, embodied by the portion shown in FIG. 3 of a plurality of image frames in FIG. 2.

Before further explain the operation of the present invention apparatus 100, certain preliminary knowledge pertaining image frame composition should be understood. Here, the well-known NTSC systems are hereby taken as an example for explanatory purpose. Please refer to FIG. 2, which is a timing diagram conceptually illustrating a plurality of sequentially incoming image frames of the apparatus 100. As is well-known in the art, in NTSC systems pixel data are sequentially transmitted and processed in a separate even field and odd field fashion, as illustrated in FIG. 4, while pixel data in the even field and in the odd field are interlaced to constitute a full image frame, as illustrated in FIG. 3. In FIG. 2, FIG. 3, and FIG. 4, two image frames 1, 0 are sequentially arranged at time T-1, and T in a timely fashion. It is to be noted that in FIG. 3 and FIG. 4 only a portion of an image frame (9 pixels in each field, or 18 pixels in each frame) is illustrated for simplicity, wherein the notations A, B, C, D, E, F, G, H, and I are representative of pixel data at respective location of a field, the substripts "e" and "o" correspond to the even field and the odd field, respectively, and the superstripts correspond to frame numbers.

As is well known to one of ordinary skill in the art, in NTSC systems, which are adopted as an example in the following description of the embodiment of the invention, the chrominance subcarrier phase rotates by 180 degrees between successive frames. This rotation causes luminance information to be misinterpreted as chrominance information, which oscillates between two complementary colors such as red and green; that is, the luminance appears to be spectral energy which oscillates between two colors represented by chrominance information 180 degrees out of phase with each other. Similar 180-degree phase rotation between successive frames can also be observed when examining the cross luminance phenomenon, i.e., the corruption of the luminance spectrum by the chrominance information.

Therefore, by averaging the chrominance information in two successive frames the out-of-phase cross color information cancels thereby allowing chrominance information to be obtained which is free of cross color. Likewise, the cross luminance information can also be cancelled by similar averaging operation. However, this technique works most effective only when the image is stationary, or still. As a result, a well-designed motion detection algorithm (or a stationary judgment algorithm) may serve to enhance the cross color suppression and/or cross luminance suppression effect, as well as the resultant display quality of the outcome of the processing, since improper cross color and/or cross luminance suppressing operation based on a poor motion detection algorithm degrades the display quality drastically.

As such, in an embodiment of the present invention, a motion detection algorithm adopted by the motion detector 102 is to be provided as in the following descriptions. Please note that the motion detection algorithm adopted by the motion detector 102 according to this embodiment is capable of being utilized in a context of a memory size of only two field buffers, that is one frame in total. Also note that here, such a 2-field buffer requirement needs not store the currently incoming image field, taking the advantage of a pixel-by-pixel operation. As a result, when the incoming field is an even field (e.g., the even field 0), the two field buffers store the pixel data of both the even field and the odd field of the previous frame (e.g., the even field 1 and the odd field 1). When the incoming field is an odd field (e.g., the odd field 0), the two field buffers store the pixel data of the even field of the current frame and the odd field of the previous frame (e.g., the even field 0 and the odd field 1).

Take the sequentially incoming image fields shown in FIG. 4 as an example, for each of the incoming pixel data, the motion detector 102 checks for a number of conditions. As a first condition, the motion detector 102 checks for the similarity between two adjacent image frames, in this embodiment, the current frame 0 at time T and the previous frame 1 at time T-1, which is one frame prior to the current frame 0. Considering the limited memory size requirement of this embodimen, the checking for similarity between two adjacent frames, though may not be as significant due to the 180 degree out-of-phase characteristic in cross color of the NTSC systems, is still of substantial meaning in determining stillness, in view of the consecutive nature of the stillness in image. When the incoming pixel data is in an incoming even field (e.g., Ee), the similarity between the two adjacent frames is checked by observing the difference between the incoming even field (e.g., the even field 0) and a stored corresponding even field (e.g., the even field 1), while when the incoming pixel data is in an incoming odd field (e.g., Eo), the similarity between the two adjacent frames is checked by observing the difference between the incoming odd field (e.g., the odd field 0) and a stored corresponding odd field (e.g., the odd field 1). The first condition may then be implemented by observing the values of the following functions:

if the incoming pixel is Ee:

$$dY_1 = |Y_{Ee} - Y'_{Ee}| < ThI\_Y_1 \qquad (1)$$

if the incoming pixel is Eo:

$$dY_1 = |Y_{Eo} - Y'_{Eo}| < ThI\_Y_1 \qquad (1)'$$

wherein Y represents the luminance information of the corresponding pixel data, respectively, and $ThI\_Y_1$ is a threshold value, whose amount should be determined according to actual applications. In this embodiment, only when the values of the above function (1) or (1) is true, is the first condition asserted to be true.

Please note that although in this embodiment, the similarity determination in the first condition is accomplished by checking the luminance information Y, for it is most indicative, the chrominance information U and V may also be incorporated into the first condition. Furthermore, although in this embodiment only the pixel information of the current pixel (i.e., Ee or Eo) is adopted for similarity determination, more pixels may be incorporated into such determination. For example, the function of (1) may also be substituted by the following function:

$$dY_1 = \sum_{X=Ae\ to\ Ie} |Y_x - Y'_x| < Thl\_Y_1$$

That is, besides of the current pixel Ee, the surrounding eight pixels in the same field are also incorporated into the similarity determination. Of course, the number and position of pixels incorporated may be altered, and similar substitutions may also be asserted to function (1)'.

In addition to the first condition, a second condition, wherein the similarity between two fields within the same frame is checked, is further considered in determining the stillness of the image for the current pixel. This is because in determining whether an image is stationary or not under a limited memory size requirement, it might also be indicative to check if the two fields within the same frame are similar or not, for the image is consecutively represented by image frames composed of such two fields. When the incoming pixel data is in an incoming even field (e.g., Ee), the similarity between two fields within the same frame is checked by observing the difference between the stored even field (e.g., the even field 1) and a stored corresponding odd field (e.g., the odd field 1), while when the incoming pixel data is in an incoming odd field (e.g., Eo), the similarity between two frames within the same frame is checked by observing the difference between the incoming odd field (e.g., the odd field 0) and a stored corresponding even field (e.g., the even field 0). The second condition may then be implemented by observing the values of the following functions:

if the incoming pixel is Ee:

$$dY_2 = |Y'_{Ee} - Y'_{Eo}| < Thl\_Y_2 \quad (2)$$

$$dU_2 = |U'_{Ee} - U'_{Eo}| < Thl\_U_2 \quad (3)$$

$$dV_2 = |V'_{Ee} - V'_{Eo}| < Thl\_V_2 \quad (4)$$

if the incoming pixel is Eo:

$$dY_2 = |Y_{Ee} - Y_{Eo}| < Thl\_Y_2 \quad (2)'$$

$$dU_2 = |U_{Ee} - U_{Eo}| < Thl\_U_2 \quad (3)'$$

$$dV_2 = |V_{Ee} - V_{Eo}| < Thl\_V_2 \quad (4)'$$

wherein Y, U, and V represent the one luminance information and two chrominance information of the corresponding pixel data, respectively, and $Thl\_Y_2$, $Thl\_U_2$, and $Thl\_V_2$ are threshold values, whose amounts should be determined according to actual applications. In this embodiment, only when the values of the above three functions (2), (3), and (4), or in alternative situation, (2), (3), and (4), are all true, is the second condition asserted to be true.

Of course as can be appreciated by those of ordinary skill in the art, the above-mentioned adoption of multiple pixels around the current pixel may also be applied to such checking for similarity between two fields within the same frame.

Besides of the first and the second conditions, a third condition, which is termed as the "high-frequency stillness within frame" condition, is further examined in determining the stillness of the image for the current pixel. The third condition checks for the high-frequency characteristic within a frame, and is more illustrative in view of FIG. 3. As an example, the following operations, wherein when the incoming pixel data is in an incoming even field (e.g., Ee), the information of the previous frame 1 is used, while when the incoming pixel data is in an incoming odd field (e.g., Eo), the information of the current frame 0 is used, are utilized. First, the following operators are so defined:

if the incoming pixel is Ee:

$$dUp\_U_3 = U'_{Ee} - U'_{Eo}$$

$$dDown\_U_3 = U'_{Ee} - U'_{Eo}$$

$$dUp\_V_3 = V'_{Ee} - V'_{Eo}$$

$$dDown\_V_3 = V'_{Ee} - V'_{Eo}$$

if the incoming pixel is Eo:

$$dUp\_U_3 = U_{Eo} - U_{Ee}$$

$$dDown\_U_3 = U_{Eo} - U_{Ae}$$

$$dUp\_V_3 = V_{Eo} - V_{Ee}$$

$$dDown\_V_3 = V_{Eo} - V_{Ae}$$

Then, the following condition pertaining the operator $dUp\_U_3$ is checked to find out the value of an additional operator $Up\_U_3$:

```
if(dUp_U3 > Thl_U3)
    Up_U3 = 1(True)
elseif(dUp_U3 < -Thl_U3)
    Up_U3 = -1(True)
else
    Up_U3 = 0(False)
```

Similar conditions respectively pertaining the operators $dDown\_U_3$, $dUp\_V_3$, and $dDown\_V_3$ are also checked to find out corresponding operators $Down\_U_3$, $Up\_V_3$, and $Down\_V_3$. And then, the following condition pertaining the operators $Up\_U_3$ and $Down\_U_3$ is further checked to find out the value of yet another operator $UpDown\_U_3$:

```
if(Up_U3 > 0&&Down_U3 > 0)
    UpDown_U3 = 1(True)
elseif(Up_U3 < 0&&Down_U3 < 0)
    UpDown_U3 = 1(True)
else
    UpDown_U3 = 0(False)
```

Similar condition pertaining the operators $Up\_V_3$ and $Down\_V_3$ is also checked to find out a corresponding operator $UpDown\_V_3$. Here if the value of any of the two operators $UpDown\_U_3$ and $UpDown\_V_3$ is true, high-frequency alternation within frame for the pixel E (either Ee or Eo) is deemed existing. In this embodiment, not only the aforementioned condition checking pertaining the pixel E, but also those pertaining the pixels D and F, i.e., the pixel on the left and the pixel on the right, are performed to render corresponding operators $UpDown\_U_3\_D$, $UpDown\_V_3\_D$, $UpDown\_U_3\_E$, $UpDown\_V_3\_E$, $UpDown\_U_3\_F$, and $UpDown\_V_3\_F$. Since high-frequency alternation within frame is likely to be observed for an image regared as stationary, due to the polarity-toggling nature of the aforementioned cross color phenomenon, only when the follow ing formula results in a value of true, is the third condition asserted to be true:

((UpDown_$U_3$_D|UpDown_$V_3$_D) &
(UpDown$_{13}U_3$_E|UpDown_$V_3$_E) & (Up-
Down_$U_3$_F|UpDown_$V_3$_F))    (5)

After all these operations, the motion detector 102 determines whether the image is stationary or not for the current pixel. In this embodiment, the image is deemed stationary for the current pixel only when the first, the second, and the third conditions are all asserted true.

After the motion detector 102 decides on whether the image is stationary or not for the current pixel, the motion control signal is then passed to the processor 104 to inform the processor 104 of the determination of the motion detector 102. If the image is deemed stationary for the current pixel, the cross color suppression and/or the cross luminance suppression operation is launched by, in this embodiment, averaging the pixel information across two consecutive image frames (for example, in the case of a current pixel Eo, $(Y_{Eo}+Y_{Eo})/2$, $(U_{Eo}+U_{Eo})/2$, and $(V_{Eo}+V_{Eo})/2$), or other suppression methods known to a skilled artisan. If the image is deemed not stationary (i.e., with motion), in this embodiment the current pixel is output as received.

Besides of the three conditions introduced above, other conditions may also be incorporated into consideration when determining the stillness of an image. One of such conditions is a fourth condition, which checks for the similarity between two consecutively transmitted image fields of different frames (e.g., the odd field 1 and the even field 0). The fourth condition may then be implemented by observing the values of the following functions:

$dY_4=|Y'_{Eo}-Y_{Ee}|<ThI\_Y_4$    (5)

$dU_4=|U'_{Eo}-U_{Ee}|<ThI\_U_4$    (6)

$dV_4=|V'_{Eo}-V_{Ee}|<ThI\_V_4$    (7)

In this embodiment, only when the values of the above three functions (5), (6), and (7) are all true, is the fourth condition asserted to be true.

Of course as can be appreciated by those of ordinary skill in the art, the above-mentioned adoption of multiple pixels around the current pixel may also be applied to such checking for similarity between two consecutive fields of two different frames.

Another one of such conditions is a fifth condition, termed as the "high-frequency stillness between frames", which checks for the high-frequency characteristic between two frames, and is more illustrative in view of FIG. 3. As an example, the following operations, wherein when the incoming pixel data is in an incoming even field (e.g., Ee), the information of the previous frame 1 plus the incoming pixel Ee is used, while when the incoming pixel data is in an incoming odd field (e.g., Eo), the information of the current frame 0 plus the corresponding pixel Eo" of the incoming pixel Eo is used, are utilized. In this embodiment, the following operators are first so defined:

if the incoming pixel is Ee:

$d\text{Up}\_U_5=U_{Ee}-U'_{Eo}$ $d\text{Down}\_U_5=U_{Ee}-U'_{Eo}$ $d\text{Up}\_V_5=V_{Ee}-V'_{Eo}$ $d\text{Down}\_V_5=V_{Ee}-V'_{Eo}$ if the incoming pixel is Eo:

$d\text{Up}\_U_5=U'_{Eo}-U_{Ee}$ $d\text{Down}\_U_5=U'_{Eo}-U_{Ae}$ $d\text{Up}\_V_5=V'_{Eo}-V_{Ee}$ $d\text{Down}\_V_5=V'_{Eo}-V_{Ae}$ Then, the following condition pertaining the operator dUp_$U_5$ is checked to find out the value of an additional operator Up_$U_5$:

```
if(dUp__U5 > Thl__U5)
    Up__U5 = 1(True)
elseif(dUp__U5 < -Thl__U5)
    Up__U5 = -1(True)
else
    Up__U5 = 0(False)
```

Similar conditions respectively pertaining the operators dDown_$U_5$, dUp_$V_5$, and dDown_$V_5$ are also checked to find out corresponding operators Down_$U_5$, Up_$V_5$, and Down_$V_5$. And then, the following condition pertaining the operators Up_$U_5$ and Down_$U_5$ is further checked to find out the value of yet another operator UpDown_$U_5$:

```
if(Up__U5 > 0&&Down__U5 > 0)
    UpDown__U5 = 1(True)
elseif(Up__U5 < 0&&Down__U5 < 0)
    UpDown__U5 = 1(True)
else
    UpDown__U5 = 0(False)
```

Similar condition pertaining the operators Up_$V_5$ and Down_$V_5$ is also checked to find out a corresponding operator UpDown_$V_5$. Here if the value of any of the two operators UpDown_$U_5$ and UpDown_$V_5$ is true, high-frequency alternation between frames for the pixel E (either Ee or Eo) is deemed existing. In this embodiment, not only the aforementioned condition checking pertaining the pixel E, but also those pertaining the pixels D and F, i.e., the pixel on the left and the pixel on the right, are performed to render corresponding operators UpDown_$U_5$_D, UpDown_$V_5$_D, UpDown_$U_5$_E, UpDown_$V_5$_E, Up-Down_$U_5$_F, and UpDown_$V_5$_F. Since high-frequency alternation between frames is not desirable for an image regared as stationary, only when the following function results in a value of true, is the fifth condition asserted to be true:

((UpDown_$U_5$_D!=1 & UpDown_$V_5$_D!=1) &
(UpDown_$U_5$_E!=1 & UpDown_$V_5$_E!=1)
& (UpDown_$U_5$_F!=1 & UpDown_$V_5$_F!=1))

Figure 5:
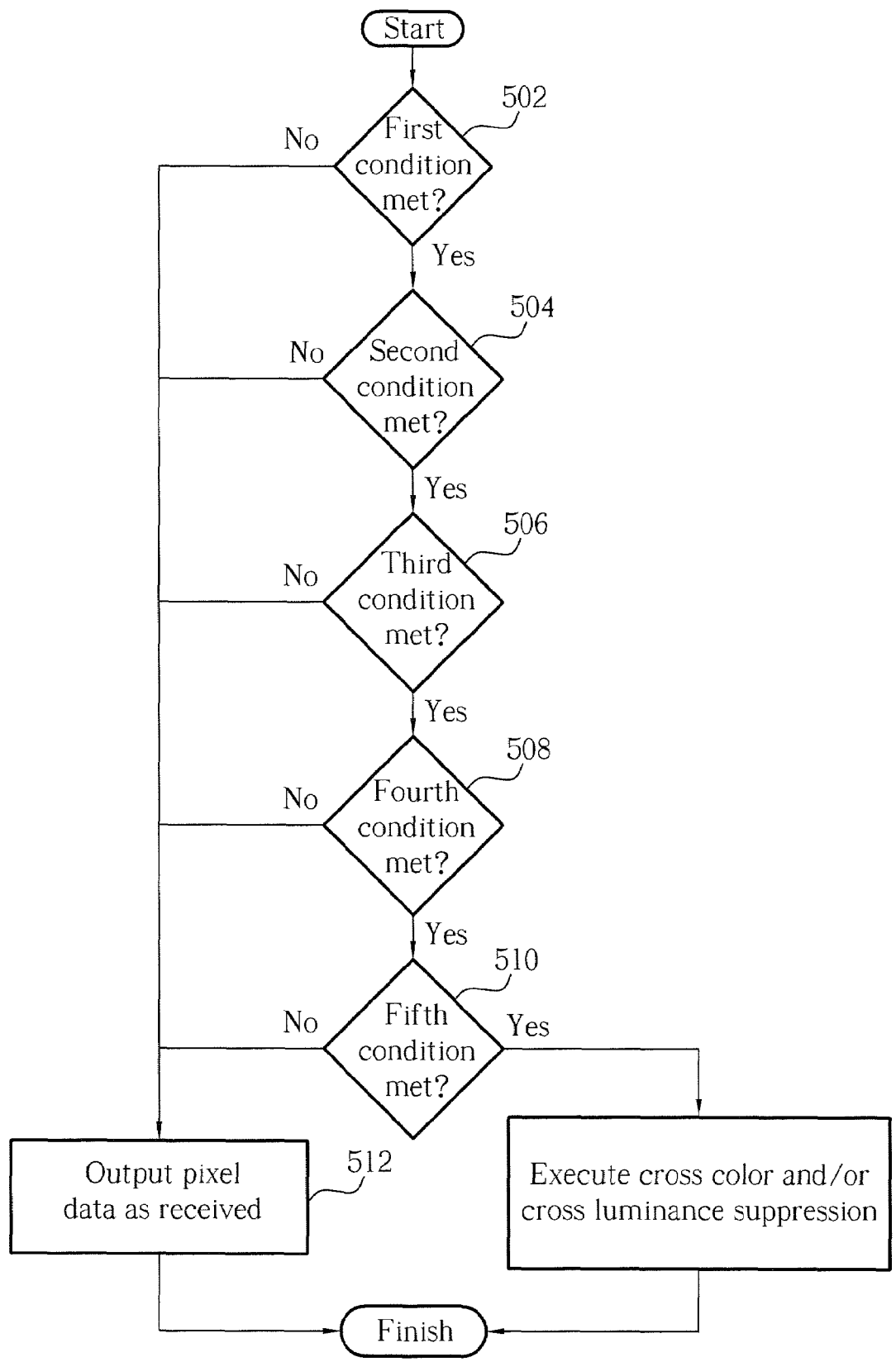
FIG. 5 is a flowchart illustrating the method of cross color and/or cross luminance suppression according to an embodiment of the present invention.

Please refer to FIG. 5, which is a flowchart illustrating the aforementioned condition checks and cross color and/or cross luminance suppression operation according to an embodiment of the present invention. A person of ordinary skill in the art should be able to understand that the order of performing the checking steps 502, 504, 506, 508, and 510 in FIG. 5 serves only as an example, is not meant to be limiting and prone to be changed. Also note that although when any of the first, the second, and the third condition is not met, pixel data are outputted as received in step 512 in this embodiment, further processing on the pixel data outputted may also be done in other embodiments. Lastly, although the fourth and fifth conditions in steps 508, 510 are both incorporated in the flowchart of FIG. 5, they may be optionally omitted in other embodiments.

Although the detailed description of the embodiments of the invention has been focused on the application in NTSC systems, the present invention may also be adapted to other display systems, such as the PAL systems. One point worth noting is that for PAL systems, the chrominance subcarrier phase rotates by 90 degrees between successive frames, as is the case for the luminance subcarrier. Therefore, the misinterpretation of luminance information as chrominance information rotates in phase by 90 degrees for each incoming frame. Bear this in mind, a skilled artisan should be able to substitute the claimed invention into a PAL system, and gain from similar improved display quality.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for processing an image in a video data, the video data comprising at least a first frame and a second frame, the first frame composed of a first even field and a first odd field, the second frame composed of a second even field and a second odd field, the method comprising:
    obtaining a first difference set between pixel information of the first frame and pixel information of the second frame, wherein the first frame and the second frame are adjacent to each other;
    examining a first criterion with the first difference set; and
    performing cross color suppressing operation on pixel information of the second frame according to a set of stationary image judgment information comprising the result of the first criterion examination;
    wherein the first difference set comprises a difference between pixel information of a target pixel in the first frame and pixel information of a corresponding pixel of the target pixel in the second frame, the target pixel is in the first odd field and the corresponding pixel of the target pixel is in the second even field.

2. The method of claim 1, wherein the first difference set further comprises a plurality of differences, each between pixel information of one of a plurality of pixels in the vicinity of the target pixel and pixel information of a corresponding pixel in the second frame, respectively.

3. The method of claim 1, wherein the first criterion comprises a comparison between a difference in the first difference set and a first threshold value.

4. The method of claim 1, wherein the cross color suppressing operation comprises averaging pixel information of the first frame and pixel information of the second frame.

5. The method of claim 1, further comprising:
    performing cross luminance suppressing operation on pixel information of the second frame according to the set of stationary image judgment information.

6. The method of claim 5, wherein the cross luminance suppression operation comprises averaging pixel information of the first frame and pixel information of the second frame.

7. The method of claim 1, wherein the pixel information comprises luminance information.

8. The method of claim 1, wherein the pixel information comprises chrominance information.

9. A method for processing an image in a video data, the video data comprising at least a first frame and a second frame, the first frame composed of a first even field and a first odd field, the second frame composed of a second even field and a second odd field, the method comprising:
    obtaining a first difference set between pixel information of the first frame and pixel information of the second frame, wherein the first frame and the second frame are adjacent to each other;
    examining a first criterion with the first difference set;
    obtaining a second difference set between pixel information of an even field and an odd field of the same frame;
    examining a second criterion with the second difference set; and
    performing cross color suppressing operation on pixel information of the second frame according to a set of stationary image judgment information comprising the result of the first criterion examination;
    wherein the set of stationary image judgment information further comprising the result of the second criterion examination.

10. The method of claim 9, wherein the even field involving the second difference set is the first even field, the odd field involving the second difference set is the first odd field.

11. The method of claim 9, wherein the even field involving the second difference set is the second even field, the odd field involving the second difference set is the second odd field.

12. The method of claim 9, wherein the second difference set comprises a difference between pixel information of a target pixel in the even field involving the second difference set and pixel information of a corresponding pixel in the odd field involving the second difference set.

13. The method of claim 12, wherein the second difference set further comprises a plurality of differences, each between pixel information of one of a plurality of pixels in the vicinity of the target pixel and pixel information of a corresponding pixel in the odd field involving the second difference set, respectively.

14. The method of claim 9, wherein the second criterion comprises a comparison between a difference in the second difference set and a second threshold value.

15. The method of claim 9, further comprising:
    performing cross luminance suppressing operation on pixel information of the second frame according to the set of stationary image judgment information.

16. The method of claim 15, wherein the cross luminance suppression operation comprises averaging pixel information of the first frame and pixel information of the second frame.

17. The method of claim 9, wherein the pixel information comprises luminance information.

18. The method of claim 9, wherein the pixel information comprises chrominance information.

19. A method for processing an image in a video data, the video data comprising at least a first frame and a second frame, the first frame composed of a first even field and a first odd field, the second frame composed of a second even field and a second odd field, the method comprising:
    obtaining a first difference set between pixel information of the first frame and pixel information of the second frame, wherein the first frame and the second frame are adjacent to each other;
    examining a first criterion with the first difference set;
    obtaining a third difference set comprising a difference between pixel information of a target pixel in one of the two frames and pixel information of the pixel at the top of the target pixel, and a difference between pixel information of the target pixel and pixel information of the pixel at the bottom of the target pixel;

examining a third criterion with the third difference set; and performing cross color suppressing operation on pixel information of the second frame according to a set of stationary image judgment information comprising the result of the first criterion examination:

wherein the set of stationary image judgment information further comprising the result of the third criterion examination.

20. A method for processing an image in a video data, the video data comprising at least a first frame and a second frame, the first frame composed of a first even field and a first odd field, the second frame composed of a second even field and a second odd field, the method comprising:

obtaining a first difference set between pixel information of the first frame and pixel information of the second frame, wherein the first frame and the second frame are adjacent to each other;

examining a first criterion with the first difference set;

obtaining a fifth difference set comprising a difference between pixel information of a target pixel in one of the two frames and pixel information of a pixel in the other of the two frames corresponding to the pixel at the top of the target pixel, and a difference between pixel information of the target pixel and pixel information of a pixel in the other of the two frames corresponding to the pixel at the bottom of the target pixel;

examining a fifth criterion with the fifth difference set; and performing cross color suppressing operation on pixel information of the second frame according to a set of stationary image judgment information comprising the result of the first criterion examination;

wherein the set of stationary image judgment information further comprising the result of the fifth criterion examination.

* * * * *